US006167500A

United States Patent [19]
Feiste et al.

[11] Patent Number: 6,167,500
[45] Date of Patent: Dec. 26, 2000

[54] MECHANISM FOR QUEUING STORE DATA AND METHOD THEREFOR

[75] Inventors: Kurt Alan Feiste; John Stephen Muhich; Steven Wayne White, all of Austin, Tex.

[73] Assignee: International Business Machines Corp., Armonk, N.Y.

[21] Appl. No.: 09/131,789

[22] Filed: Aug. 10, 1998

[51] Int. Cl.[7] .................................................. G06F 12/00
[52] U.S. Cl. ............................... 712/1; 710/131; 711/146
[58] Field of Search ................................. 712/1, 23, 41; 710/131, 1; 711/146

[56] References Cited

U.S. PATENT DOCUMENTS

| | | | |
|---|---|---|---|
| 4,782,441 | 11/1988 | Inagami | 712/9 |
| 5,488,706 | 1/1996 | Wendorf | 710/5 |
| 5,500,943 | 3/1996 | Ho | 712/218 |
| 5,598,574 | 1/1997 | Yoshinaga | 712/2 |
| 5,832,297 | 11/1998 | Ramagopal | 710/5 |
| 5,930,485 | 7/1999 | Kelly | 710/112 |
| 5,974,522 | 10/1999 | Torng | 712/23 |

*Primary Examiner*—Eric Coleman
*Attorney, Agent, or Firm*—Barry S. Newberger; Winstead Sechrest & Minick P.C.; Anthony V. S. England

[57] ABSTRACT

A mechanism and method for a store data queue are implemented. Address translation operations for store instructions in a data processor are decoupled from data operations by initiating address translation before source data operands are available. A store data queue snoops the finish buses of execution units for the source operand. A data entry in the data queue that is allocated at dispatch of the store instruction snoops for the source operand required by its corresponding instruction. The data operand is then communicated to a memory device in instruction order thereby simplifying the detection of conflicting stores.

35 Claims, 6 Drawing Sheets

MECHANISM FOR QUEUING STORE DATA AND METHOD THEREFOR

TECHNICAL FIELD

The present invention relates in general to a data processing system, and in particular, to parallel calculation of store addresses and store data in store data instructions.

BACKGROUND INFORMATION

In a data processing system, store instructions store a single data operand from a register into a memory device. The source operand to be stored in the memory device may be dependent upon the execution of prior instructions for its calculation. Moreover, the store instruction may include address operands from which the target address in the memory device is to be calculated. That is, the location in the memory device for the storage of the source data operand is calculated from address operands specified in the store instruction.

Thus, the execution of a store instruction may depend both on the availability of a source operand and the generation of the store target address. Moreover, the generation of the target address may also depend on the availability of precursor source operands for the computation of the address. According to the prior art, the execution of a fixed-point store instruction is held until both address and data operands are available. Subsequent instructions which depend on the results of the fixed-point store instruction are then also delayed until the instruction upon which they depend completes. Floating-point store mechanisms according to the prior art are not so delayed.

The necessity for both address and data operand availability thus delays execution of dependent instructions subsequent to a fixed-point store operation. Thus, there is a need in the art for a mechanism by which address calculations are decoupled from the data portion of the store, thereby reducing the latency of the store instruction, and dependent instructions succeeding the store instruction. There is, additionally, a need for a store mechanism that is common for both fixed-point and floating-point operations.

SUMMARY OF THE INVENTION

The previously mentioned needs are addressed with the present invention. Accordingly, there is provided, in a first form, a store data queue mechanism for decoupling store address operations and store data operations. The store data queue mechanism includes a store data queue having a plurality of queue entries operable for receiving store data from a plurality of execution unit result busses and outputting the store data to a memory device.

There is also provided, in a second form, a store data queue method. The method includes the step of, at dispatch of a store instruction, allocating an entry in a store data queue for receiving a store data operand value of the store instruction. A plurality of execution unit result buses are snooped for the store data operand value. The store data operand value is loaded in the entry in the store data queue when the store data operand value appears on one of the result buses.

Additionally, there is provided, in a third form, a data processing system. The data processing system includes an input means for communicating a plurality of instructions, in which the instructions implement data store instructions, and a processing unit receiving the data store instructions. The processing unit includes a store data queue operable for receiving a store data operand value from a result bus of one or more execution units, wherein the store data queue is operable for loading data into a memory device. The store data queue includes a plurality of queue entries each being operable for receiving the store data operand. The result bus is operable for snooping by each queue entry in response to a predetermined data value in a portion of the queue entry.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention provides a store data queue mechanism and method that supports independent address generation and data operations in a processor store instruction. The store data queue mechanism snoops result buses of the processor execution units for the data operand of the instruction. When the source operand is generated by a precursor, or target, instruction, the store data queue mechanism retrieves the resultant operand and stores it in a data queue. There is no need to keep operands in a rename register file. The store data is then transferred to a memory device. Data is transferred to a memory device in instruction order making conflicting stores easy to detect. However, transfer to the data queue need not be in order.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
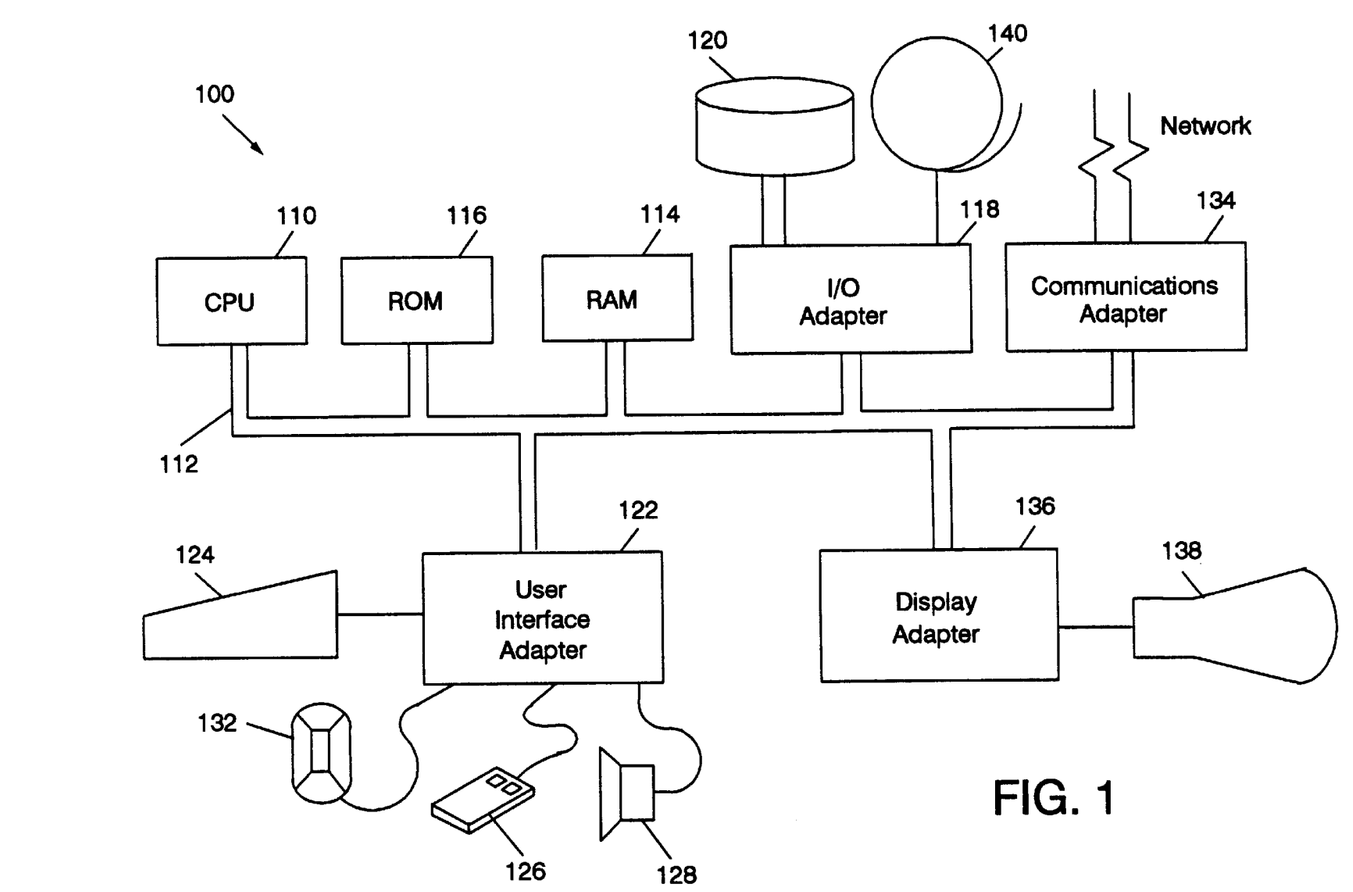
FIG. 1 illustrates, in block diagram form, a data processing system in accordance with an embodiment of the present invention.

A representative hardware environment for practicing the present invention is depicted in FIG. 1, which illustrates a typical hardware configuration of data processing system 113 in accordance with the subject invention having central processing unit (CPU) 110, such as a conventional microprocessor, and a number of other units interconnected via system bus 112. Data processing system 113 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting data processing system 113 to a data processing network, and display adapter 136 for connecting bus 112 to display device 138. CPU 110 incorporates a store data queue mechanism in accordance with the principles of the present invention. CPU 110 may include other circuitry not shown herein, which will include circuitry commonly found within a microprocessor, e.g., execution unit, bus interface unit, arithmetic logic unit, etc. CPU 110 may also reside on a single integrated circuit.

Figure 2:
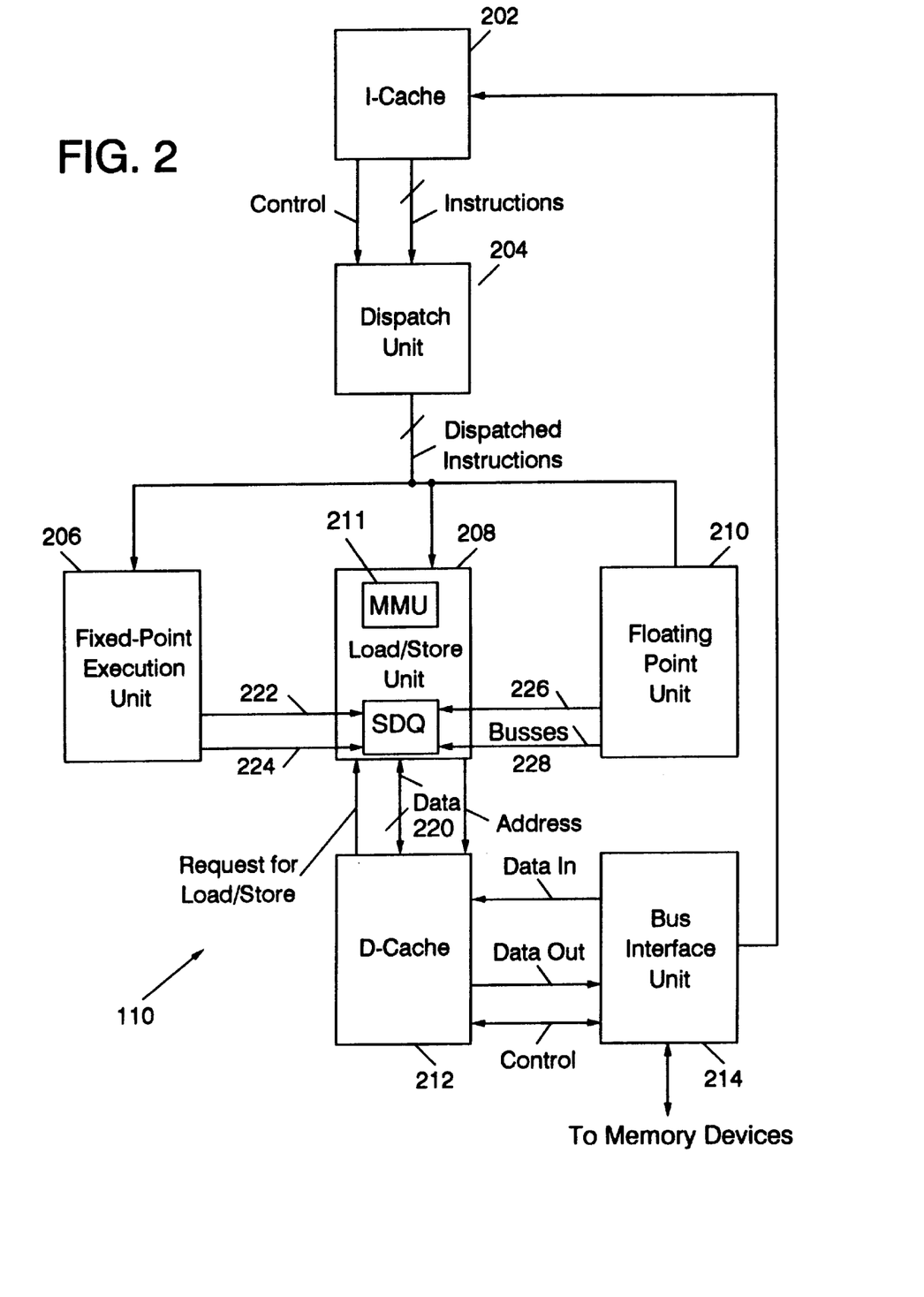
FIG. 2 illustrates, in block diagram form, a central processing unit in accordance with an embodiment of the present invention.

FIG. 2 illustrates a portion of CPU 110 in greater detail. The portion of CPU 110 includes an instruction cache (I-cache) 202, an instruction unit/branch unit 204, a fixed point execution unit (FXU) 206, load/store unit 208, including store data queue mechanism (SDQ) 209, a floating point unit (FPU) 210, a data cache (D-cache) 212, and a bus interface unit (BIU) 214.

I-cache 202 is coupled to instruction unit/branch unit 204 to communicate control information and a plurality of instructions. Instruction unit/branch unit 204 is coupled to each of FXU 206, load/store unit 208, and FPU 210 to provide a plurality of dispatched instructions. I-cache 202 is coupled to BIU 214 to communicate data and control information. FXU 206 is coupled to SDQ mechanism 209 to communicate store data values. FPU 210 is coupled to SDQ mechanism 209 to communicate store data values. Load/store unit 208 is coupled to D-cache 212 to communicate a request for a load/store signal. SDQ mechanism 209 is coupled via bus 220 to D-cache 212 to communicate a plurality of store data values. An address value is generated in processing unit 211 and communicated to D-cache 212. D-cache 212 is coupled to BIU 214 to communicate a Data In signal, a Data Out signal, and a Control signal.

Figure 3A:
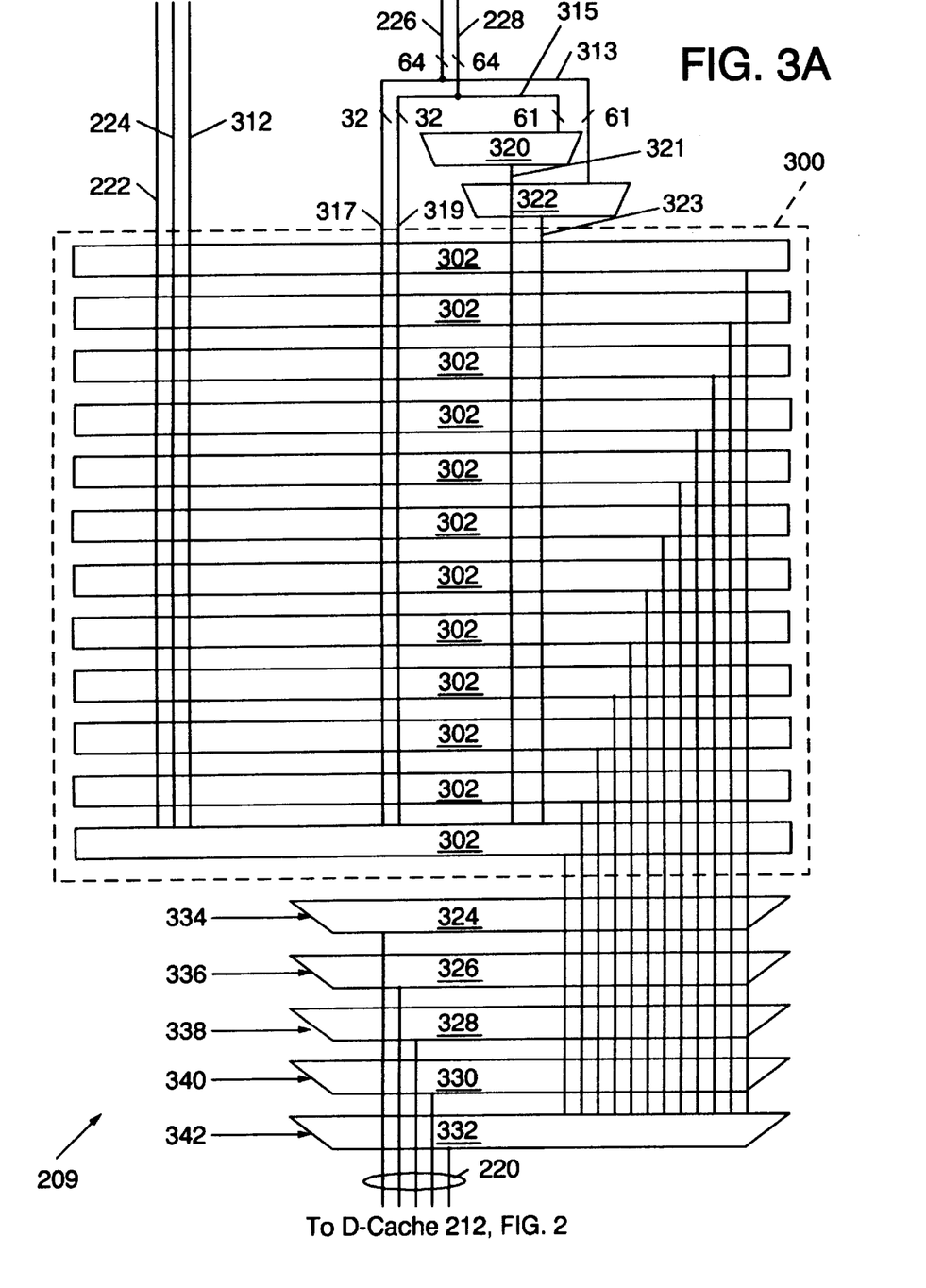
FIG. 3A illustrates, in block diagram form, a store data queue mechanism in accordance with an embodiment of the present invention.

FIG. 3A illustrates SDQ mechanism 209 within load/store unit 208, in accordance with the principles of the present invention. SDQ mechanism 209 includes data queue 300 containing a plurality of registers, data queue entries 302. In an embodiment of the present invention, data queue 300 may be a circular queue. In such an embodiment, a first pointer indicates the next data queue entry 302 to be allocated, and a second pointer indicates the next data queue entry 302 to be written to D-cache 212.

Each of registers 302 is coupled to a plurality of result buses, result buses 222, 224, and 312. In an embodiment of the present invention, result buses 222 and 224 may be first and second FXU result buses, respectively. Result bus 312 may be a level two (L2) cache forwarding bus. Each of result buses, 222, 224, and 312 may be 32-bit buses.

SDQ mechanism 209 also snoops FPU result buses, result buses 226 and 228, associated with a first FPU and a second FPU, respectively. Each of FPU result buses 226 and 228 may be 64-bit buses. In such an embodiment, an upper 32-bit portion, 317 and 319 respectively, of each of result buses 226 and 228 are coupled to registers 302. Another portion of result bus 226 and result bus 228 are coupled to inputs of MUXES 320 and 322, respectively. The output of each of MUXES 320 and 322 are coupled to registers 302. MUXES 320 and 322 select for outputting a portion of signals on result bus 226 and result bus 228, respectively. The operation of MUX 320 and 322 will be further described below, in conjunction with FIG. 4.

Each of registers 302 in data queue 300 is coupled to an input of MUXes 324, 326, 328, 330, and 332. MUXes 324, 326, 328, 330 and 332 receive the data operand values stored in registers 302. Outputs from each of MUXes 324, 326, 328, 330 and 332 are coupled to a corresponding entry (not shown) in D-cache 212, in FIG. 2.

Recall data queue 300 may be a circular queue, and selection of the oldest data operand values contained in registers 302 is effected via MUXes 324, 326, 328, 330, and 332. Each MUX selects for a data operand value stored in a corresponding register 302 coupled to a predetermined one of its inputs in response to control signals 334, 336, 338, 340, and 342 provided to MUXes 324, 326, 328, 330, and 332, respectively. Control signals 334, 336, 338, 340, and 342 are received from a store address queue (not shown) in processing unit 211. In this way, the oldest store data is selected to be written to D-cache 212 (FIG. 2).

Figure 3B:
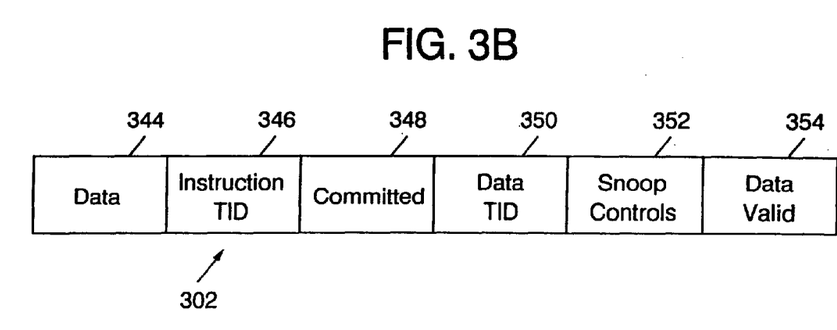
FIG. 3B schematically illustrates a store data queue entry in accordance with an embodiment of the present invention.

Refer now to FIG. 3B in which is illustrated a queue entry 302 according to an embodiment of the present invention. Queue entry 302 includes six fields, 344, 346, 348, 350, 352, and 354. The data received from one of busses 222, 224, 312, 317 and 319, and outputs 321 and 323 is stored in data field 344. The TID of the store instruction itself is contained in instruction TID field 346. This field may be used to remove data entries from queue entry 302 if the corresponding store instruction is flushed in response to a global flush command. If the store instruction is guaranteed to complete (by comparing a global completion TID bus with the TID in field 346), then a predetermined data value is set in committed field 348. This disables the flush with respect to queue entry 302 and the TID contained in instruction TID field 346 may be reassigned to a new instruction. Data TID field 350 includes the TID of the precursor instruction producing the store data. The TID stored in data TID field 350 is matched against TIDs sent along with the result busses. It controls the loading of data field 344, along with snoop control data. Snoop control data is contained in snoop control field 352 and associates queue entry 302 with a corresponding one of result busses 222, 224, 312, 226 and 228. Data is loaded into field 344 if the TID in data TID field 350 appears on the bus corresponding to the data value in snoop control field 352. In response, a predetermined data value is set in data valid field 354, and the snoop control data value in field 352 is negated. In response to the predetermined data value set in field 354, data may be written to D-cache 212, FIG. 2.

In an embodiment of the present invention, snoop control data values in field 352 may signal that queue entry 302 is to load preselected bits from a corresponding result bus. An fpu-high data value may signal queue entry 302 is snooping an FPU bus, such as busses 226 and 228, for high-order floating-point data bits. Similarly, an fpu-low data value may signal queue entry 302 is snooping an FPU bus for low-order floating-point data bits. A STFIWX data value also may indicate that entry 302 is snooping for low-order bits, however, as previously described, the FPU bus will signal a floating point double to SDQ mechanism 209, FIG. 2. A snoop-FXU data value indicates that queue entry 302 is snooping an FXU result bus, such as bus 222 and bus 224. It would be understood by an artisan of ordinary skill, that, in an embodiment of the present invention, each of the fpu-high, fpu-low, snoop-FXU and STFIWX data values may constitute a corresponding predetermined sequence of bits.

Furthermore, data TIDs need not necessarily be unique in an embodiment of the present invention. An embodiment having queue entry 302 of FIG. 3B may share TIDs between floating-point operations and fixed-point operations. Because queue entry 302 is associated with a corresponding result bus by snoop control data, such an embodiment of the present invention may share common data TID values between FXUs and FPUs.

Figure 4:
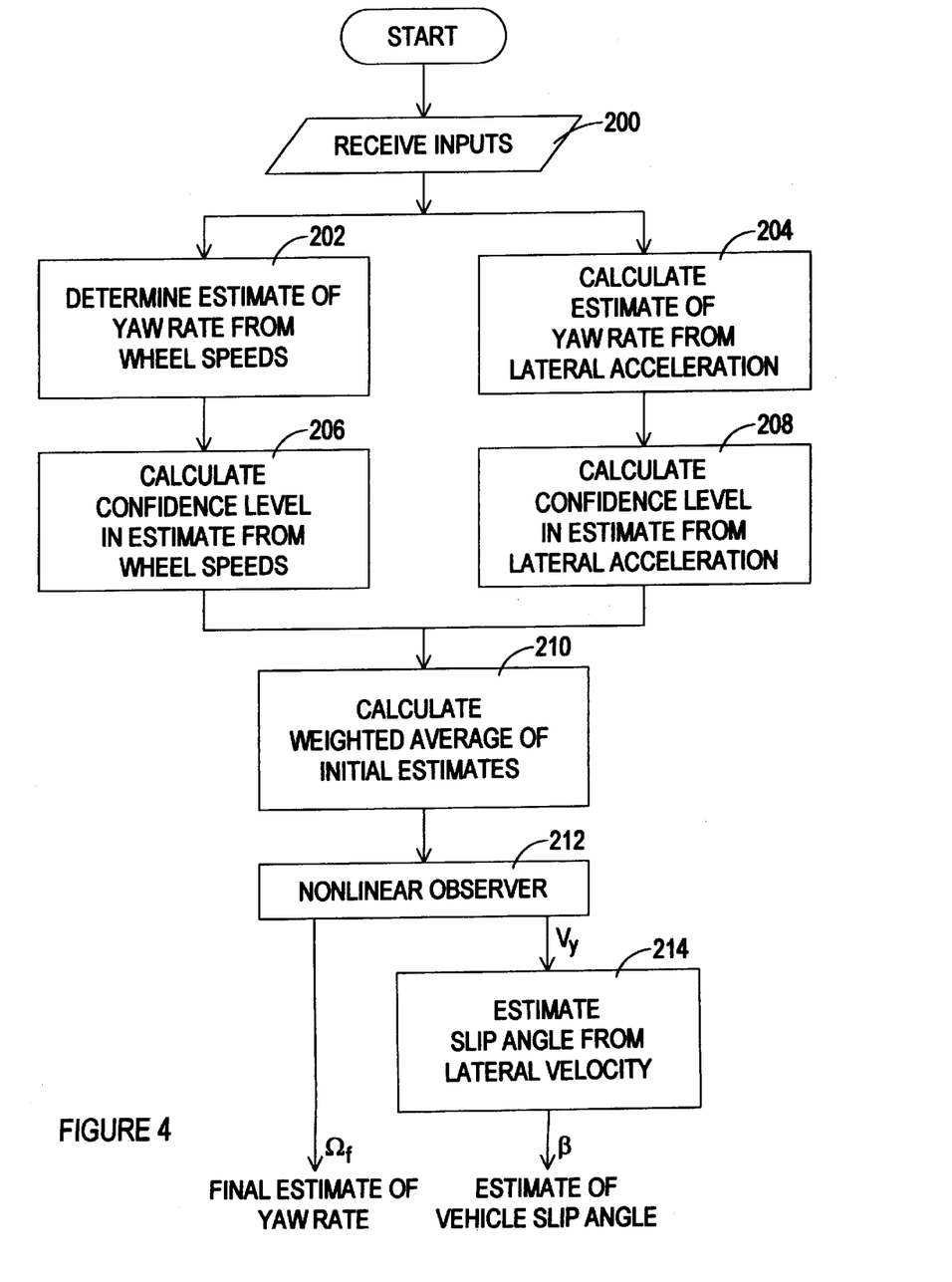
FIG. 4 illustrates, in block diagram form, a portion of a store data queue mechanism in accordance with an embodiment of the present invention.

In order to further understand the operation of MUXes 320 and 322, refer now to FIG. 4 in which is depicted a portion 400 of SDQ mechanism 209. Portion 400 includes MUX 320 having two inputs 402 and 404, each of which are coupled to a portion of FPU result bus 226. Another portion, 317, of FPU result bus 226, including bits 0–31, in an embodiment in which FPU result bus 226 is 64-bits wide, is coupled to store data queue 300, as previously discussed in conjunction with FIG. 3. Output 321 of MUX 320 is also coupled to store data queue 300.

MUX 320 selects for floating point single and floating point double results. MUX 320 receives control signal 408 from FPU result bus 226. Control signal 408 indicates if the result is a floating point single result or a floating point double result. For a floating point double result, MUX 320 selects for outputting, in an embodiment in which FPU result bus 226 is 64-bits wide, bits 32:63 of portion 315 on input 402. These are stored in a first data queue entry 302 (not shown in FIG. 4) in store data queue 300, with bits 0:31 received from portion 317 stored in a second data queue entry 302 (not shown in FIG. 4).

For floating point singles, a single store data queue entry 302 monitors the floating point result buses 226 and 228 in FIG. 3. When the result operand corresponding to the store data queue entry is available on result bus 226 in FIG. 4, control signal 408 selects for storing bits 0, 1, 5:11, and 12:34 of portion 315 on input 404 for storing in a corresponding store data entry 302 (not shown in FIG. 4).

Additionally, a subset of store instructions performs a store of the lower 32-bits of a floating point register. In an embodiment of the present invention, these may be store floating point as integer word indexed (STFIWX) instructions. For such instructions, one data queue entry monitors floating point result bus 226. FPU result bus 226 signals a floating point double on control signal 408, even though a 32-bit store is to be performed. In this way, MUX 320 selects for the lower 32-bits (32:63) of portion 315 on input 402 for storing in the corresponding data queue entry 302 (not shown in FIG. 4).

Only a single one of MUXES 320 and 322 in FIG. 3 have been shown in portion 400 of store queue data mechanism 309 for clarity. It would be understood that MUX 322 in FIG. 3 would operate in precisely the same way as MUX 320 in portion 400 in FIG. 4.

Figure 5:
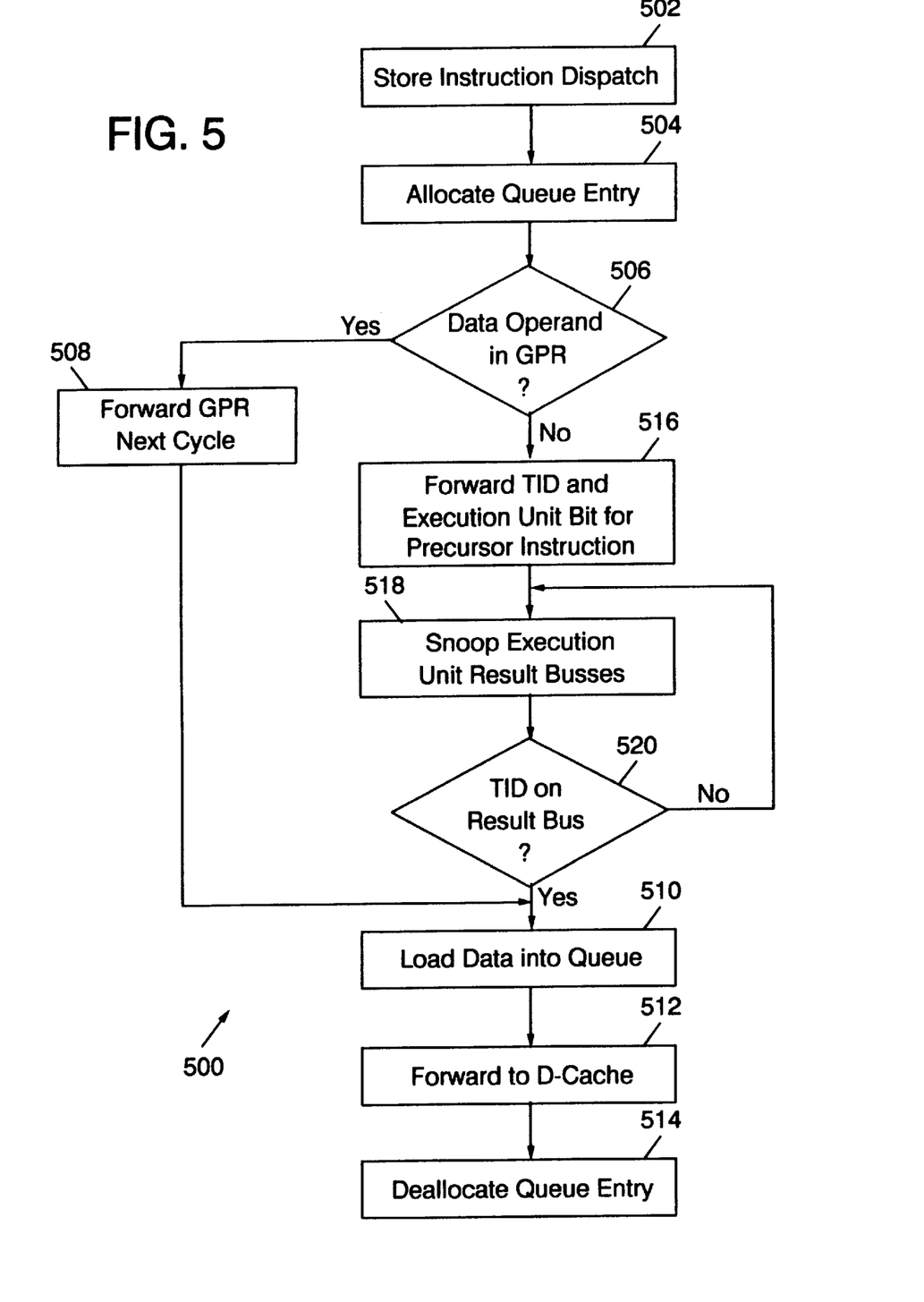
FIG. 5 illustrates, in flowchart form, a store data queue method in accordance with an embodiment of the present invention.

The operation of SDQ mechanism 209 may be further understood by referring now to FIG. 5 in which is illustrated a flowchart of a store data queue method according to the present invention. A store instruction is dispatched in step 502. In step 504 queue entries, 302 in FIG. 3, are allocated to receive store data associated with the store instruction dispatched in step 502.

In an embodiment of the present invention in which load/store unit 208 (FIG. 2) has an instruction queue (not shown) with five slots, up to five queue entries 302 (FIG. 3) may be allocated per cycle. Five queue entries 302 (FIG. 3) may be allocated for store multiple and store string instructions. For store word and store double instructions dispatched to a preselected one of the first three instruction queue slots (not shown), up to two queue entries 302 (FIG. 3) may be allocated. If the instruction is dispatched to the last two slots, queue entries 302 may be allocated if the instruction is a store word, otherwise dispatch is held.

If, in step 506, the required data operand is in an architected register, the value is forwarded from the architected register at the next instruction cycle, in step 508. In step 510, the data is then loaded into queue 300 in the allocated queue entry 302, in FIG. 3. When store data queue 300, FIG. 3, indicates that the queue entry allocated in step 504 has valid data and is one of a pre-determined number of queue entries 302 at the bottom of store data queue 300 in FIG. 3, when the store is ready to complete, the store data is forwarded, in step 512, to D-cache 212 in FIG. 2. In step 514, the queue entry allocated in step 504 is de-allocated.

Otherwise, if, in step 506, the store data operand was not in an architected register, store data queue 300 in FIG. 3 must snoop execution unit result buses for the store data operand. In step 516, a tag ID (TID) associated with a precursor instruction, that is the instruction whose result operand is the required store data operand, is forwarded to store data queue 300 in FIG. 3. It would be understood by one of ordinary skill in the art, that one or more store instructions may depend on the same precursor instruction, in which case the TID received by store data queue 300, in step 516, would be the same for each such store instruction.

The TID received in step 516 may be stored in field 350 in FIG. 3B. Also passed in step 516 is a data value associating the TID with a fixed-point operation or a floating-point operation. This data value may constitute snoop control data for entry in field 352 in FIG. 3B.

Execution result busses are snooped in step 518. The snoop control data value in field 352, FIG. 3B, indicates whether the store data queue entry 302 (FIG. 3) is monitoring FPU result busses or fixed-point result busses, as discusses hereinabove. If, in step 520, the TID of the precursor instruction, forwarded in step 516, appears on the corresponding result bus, the store data is loaded on step 510, into the store data queue entry 302 (FIG. 3) allocated in step 504. Method 500 continues with steps 512 and 514 as previously described. Otherwise, if in step 520, the TID forwarded in step 516 has not appeared on the result bus, method 500 continues snooping by returning to step 518.

The decoupling of store address operations and store data operations by a store data queue mechanism in accordance with the principles of the present invention may be further understood by considering the following example instruction sequence:

| (1) L    | R10,R3,R1    | ; cache miss                       |
|----------|--------------|------------------------------------|
| (2) ADD  | R10,R10,R5   | ; dependent (1) on cache miss     |
| (3) STXU | R10,R2,R1    | ; store data dependent (2)         |
| (4) L    | R11,R3,R1    | ; load hit reload                  |
| (5) ADD  | R11,R11,R6   | ; dependent on (4)                 |
| (6) STXU | R11,R2,R1    | ; store data dependent on (5)      |
| (7) ADD  | R4,R1,R2     | ; dependent on address update from (6) |
| (8) DIV  | R20,R21,R22  | ; resource dependent on (6)        |

Figure 6:
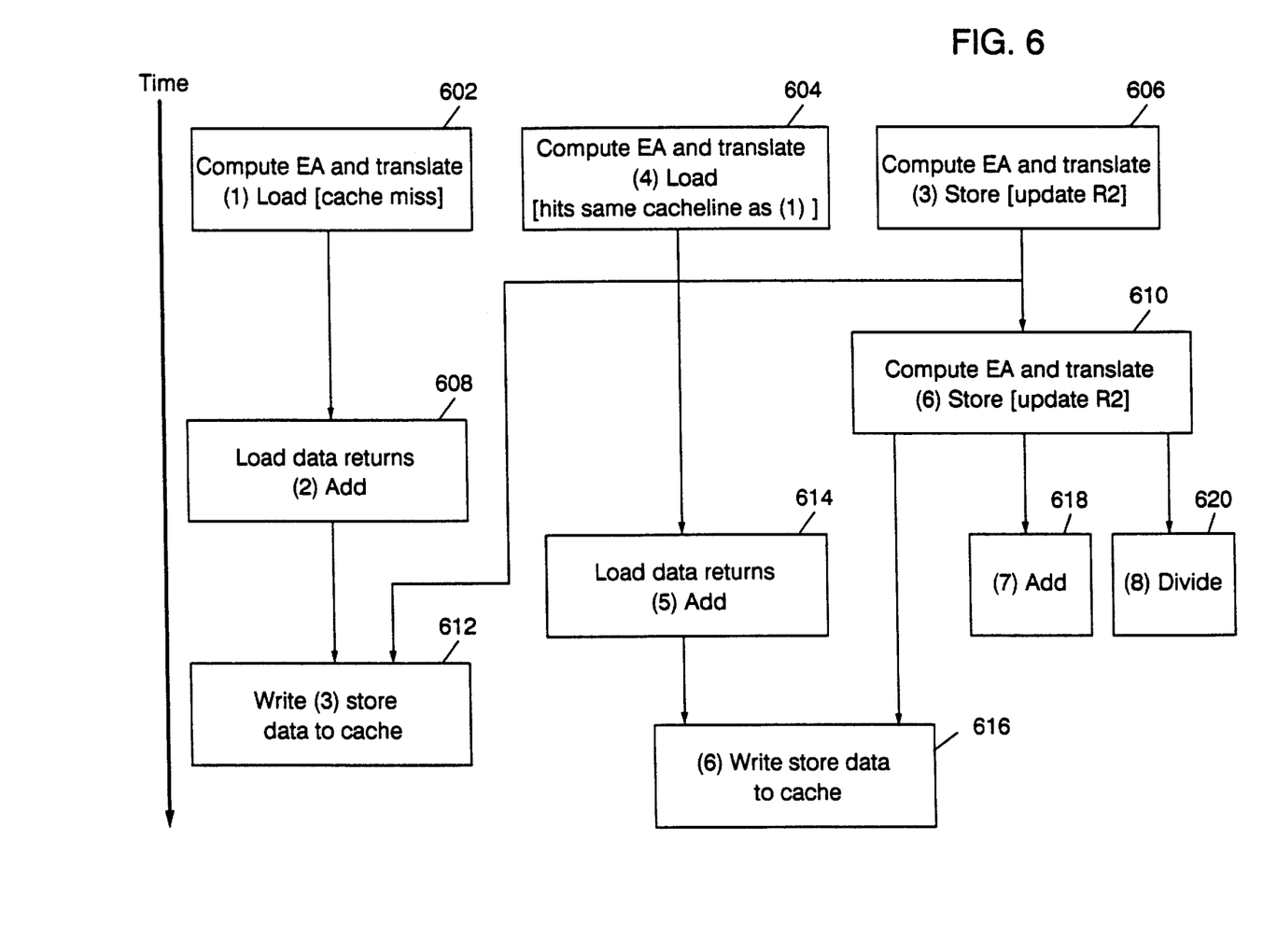
FIG. 6 schematically illustrates execution dependency in accordance with an example of an instruction sequence.

This instruction sequence will be described in association with FIG. 6 illustrating instruction dependency for the example instruction sequence.

This example sequence includes two load (L) instructions (1) and (4) and two store with update (STXU) instructions, (3) and (6). The instruction format of these load/store instructions is the same. The first operand is a target register operand that holds a data value, received in the load operation, or to be stored in memory, respectively. The second and third operands are register operands that contain address values for generating an effective address by processing unit 211 within load/store unit 208 in FIG. 2, and used to generate physical addresses associated with a storage device (not shown). In the update forms of the instructions as shown in the example sequence, the second operand is updated with the effective address.

The second instruction in the example instruction sequence is an add (ADD) instruction that adds the contents of the second and third operands, register 10 and register 5, and loads it into the first operand, register 10. Because R10 is the target operand of the preceding L instruction (1) the ADD instruction (2) must wait until the L instruction (1) has retrieved the source data and loaded it into R10. If the source data to be loaded into R10 has not been fetched into cache, then the L instruction (1) generates a cache miss on which ADD instruction (2) is dependent.

Following ADD instruction 2 is the first STXU instruction (3) which stores the contents of R10 into a memory device (not shown) whose physical address is determined using an effective address calculated from the contents of R2 and R1. Thus, STXU instruction (3) is dependent on the preceding ADD instruction (2). The second L instruction (4) does not depend on source operands generated by any of the first three instructions, but L instruction (4) hits the same cache line as L instruction (1).

Thus, referring to FIG. 6, processing unit 211 in FIG. 2 may simultaneously begin address operations on L (1), STXU instruction (3), and L instruction (4), as illustrated in steps 602, 604, and 606, respectively. In particular, the address operations associated with STXU instruction (3) can commence in step 606 although its stored data, dependent upon ADD instruction (2), is not available, and only becomes available later in time, at step 608.

Likewise, STXU instruction (6) is dependent on ADD instruction (5). ADD instruction (5) is, in turn, dependent on a return of L instruction (4). However, because of the decoupling of address operations and store data operations with respect to STXU instruction (6), effective address computation and translation, step 610, in STXU instruction (6) may begin before the store data is available from ADD instruction (5) on which STXU instruction (6) depends. Moreover, because of the decoupling of address operations and store data operations, data operands may be entered into the SDQ before address calculations finish. In other words, operands need not be kept in the execution units waiting for store address execution.

The store data operations of STXU instruction (3) and STXU instruction (6) are decoupled from the address operations in steps 606 and 610. When ADD instruction (2), on which STXU instruction (3) depends, finishes execution, its TID appears on an FXU result bus along with the operand required by STXU instruction (3). At completion of STXU instruction (3), the store address calculation results from step 606 are used in writing the store data in STXU instruction (3) to D-cache 212 (FIG. 2), in step 612. Similarly, ADD instruction (5) can execute when the load data on which it depends from L instruction (4) returns in step 614. In step 616, STXU instruction (4) store data obtained by snooping an FXU result bus for the TID of ADD instruction (5) may be written to D-cache 212 (FIG. 2), using results from the store address calculations in step 610.

ADD instruction (7) depends on the address update in STXU instruction (6). STXU instruction (6) updates the contents of R2 which are used to provide one of the source operands of ADD instruction (6). In an embodiment of CPU 110, in FIG. 2, according to the principles of the present invention, ADD instruction (6) can execute, step 618, when address translation operations of STXU instruction (6) have finished, in step 610. By decoupling the address and data portions of store instructions in the present invention, the dependent ADD instruction (7) may execute earlier.

Other dependencies may be overlapped in CPU 110, FIG. 2, in accordance with the present invention. In an embodiment of CPU 110, FIG. 2, divide (DIV) instructions may share execution resources with store instructions. On such an embodiment, according to the principles of the present invention, DIV instruction (8) may execute, in step 620, when a preceding store instruction, such as STXU instruction (6) finishes its address translation operations.

Although the present invention and its advantages have been described in detail, it should be understood that various changes, substitutions and alterations can be made herein without departing from the spirit and scope of the invention as defined by the appended claims.

What is claimed is:

1. A store data queue mechanism comprising a store data queue including a plurality of queue entries operable for receiving store data from a plurality of execution unit result buses and outputting said store data to a memory device, wherein each queue entry receives said store data in response to a preselected identifier value on a portion of a preselected one of said plurality of result buses, said preselected one of said plurality of result buses being preselected in response to a first data value in a first portion of each storage unit.

2. The store data queue mechanism of claim 1 wherein said preselected identifier comprises an identifier associated with an instruction generating said store data value.

3. The store data queue mechanism of claim 1 further comprising at least one first multiplexer having a first input operable for receiving data from a first predetermined portion of first execution unit result bus and a second input operable for receiving data from a second predetermined portion of said first result bus, wherein said plurality of queue entries are coupled to an output of said at least one multiplexer, and to one or more second execution result buses and, wherein said at least one multiplexer is operable for selecting said first input and said second input in response to a first control signal from said first result bus.

4. The store data queue mechanism of claim 1 further comprising a plurality of second multiplexers each having a plurality of inputs, each input coupled to one of said plurality of queue entries, each said multiplexer selecting for outputting one of said plurality of inputs in response to a first control signal, and wherein each multiplexer has an output coupled to a corresponding portion of said data storage device.

5. The store data queue mechanism of claim 3 wherein said one or more second execution unit result buses comprises one or more integer data result buses.

6. The store data queue mechanism of claim 3 wherein said one or more first execution unit result buses comprises one or more floating point data result buses.

7. The store data queue mechanism of claim 3 wherein said first control signal has a first value and a second value.

8. The store data queue mechanism of claim 7 wherein said first value signals a floating point single data value and said second value signals a floating point double data value.

9. The store data queue mechanism of claim 1 wherein said first data value comprises an fpu-high data value.

10. The store data queue mechanism of claim 1 wherein said first data value comprises an fpu-low data value.

11. The store data queue mechanism of claim 1 wherein said first data value comprises a snoop-FXU data value.

12. The store data queue mechanism of claim 1 wherein said first data value comprises a STFIWX data value.

13. The store data queue mechanism of claim 1 wherein said first data value comprises an instruction identifier tag (TID).

14. The store data queue mechanism of claim 1 wherein each queue entry further comprises a second portion for storing a predetermined second data value, and wherein each queue entry is operable for disabling for flushing in response to said second data value.

15. A store data queue method comprising the steps of:
   at dispatch of a store instruction, allocating an entry in a store data queue for receiving a store data operand value of said store instruction;
   snooping one or more execution unit result buses for said store data operand value; and
   loading said store data operand value in said entry in said store data queue when said store data operand value appears on one of said result buses.

16. The method of claim 15 further comprising the step of sending an identifier value to said store data queue entry, wherein said identifier value is associated with an instruction generating said store data operand value.

17. The method of claim 16 wherein said snooping step further comprises the step of snooping said result buses for said identifier value.

18. The method of claim 15 wherein said loading step is in response to said identifier value sent to said store data queue entry matching an identifier value received in said snooping step.

19. The method of claim 15 further comprising the step of preselecting said one or more execution unit result buses for snooping in response to a predetermined data value in a portion of said store data queue entry.

20. The method of claim 15 further comprising the step of sending said store data operand value to a memory device.

21. The method of claim 15 further comprising the step of deallocating said store data queue entry when said store data operand value has been loaded into a memory device.

22. The method of claim 19 wherein said predetermined data value comprises an fpu-high data value.

23. The method of claim 19 wherein said predetermined data value comprises an fpu-low data value.

24. The method of claim 19 wherein said predetermined data value comprises a snoop-FXU data value.

25. The method of claim 19 wherein said predetermined data value comprises a STFIWX data value.

26. The method of claim 16 wherein said identifier value comprises a tag ID (TID).

27. The method of claim 19 further comprising the step of disabling for flushing said store data queue entry in response to a predetermined data value in a portion of said store data queue entry.

28. A data processing system comprising:
   an input means for communicating a plurality of instructions, said instructions implementing data store instructions;
   a processing unit receiving said data store instructions, said processing unit including a store data queue operable for receiving a store data operand value from a result bus of one or more execution units, wherein said store data queue is operable for loading data into a memory device, wherein said store data queue includes a plurality of queue entries, each queue entry being operable for receiving said store data operand value, and wherein said result bus is operable for snooping by each queue entry in response to a predetermined data value in a portion of each storage unit.

29. The data processing system of claim 28 wherein said store data queue receives said store data operand in response to a preselected identifier value on a portion of said result bus.

30. The data processing system of claim 29 wherein preselected identifier comprises an identifier associated with an instruction generating said store data value.

31. The data processing system of claim 28 wherein said store data queue is operable for selecting for storage said store data value from a first portion of said result bus and a second portion of said result bus.

32. The data processing system of claim 31 wherein said store data queue selects for storage said store data value from said first portion and said second portion in response to a signal on a third portion of said result bus.

33. The data processing system of claim 32 wherein said signal on said third portion of said result bus comprises a first data value corresponding to a floating point single data value and a second value corresponding to a floating point double data value.

34. The data processing system of claim 28 wherein said store data queue further comprises plurality of multiplexers each having a plurality of inputs, each input coupled to one of said plurality of queue entries, each said multiplexer selecting for outputting one of said plurality of inputs in response to a control signal received from said processing unit, and wherein each multiplexer has an output coupled to a corresponding portion of said data storage device.

35. The data processing system of claim 34 wherein said processing unit further comprises an address processing unit for generating store addresses in said data storage device, said address processing unit providing said control signal to each multiplexer.

* * * * *

UNITED STATES PATENT AND TRADEMARK OFFICE
CERTIFICATE OF CORRECTION

PATENT NO. : 6,167,500
DATED : December 26, 2000
INVENTOR(S) : Kurt Alan Feiste, John Stephen Muhich and Steven Wayne White It is certified that error appears in the above-identified patent and that said Letters Patent is hereby corrected as shown below:

<u>Drawings,</u>
Replace "Figure 4" with attached drawing of Figures 3B and 4.

Signed and Sealed this

Eighteenth Day of June, 2002

Attest:

Attesting Officer

JAMES E. ROGAN
Director of the United States Patent and Trademark Office

FIG. 3B

FIG. 4